United States Patent
Antreasyan et al.

(10) Patent No.: US 10,228,229 B2
(45) Date of Patent: *Mar. 12, 2019

(54) TOUCH TRIGGER PROBE

(71) Applicant: TESA SA, Renens (CH)

(72) Inventors: Dikran Antreasyan, Meyrin (CH); Christophe Jaquet, La Sarraz (CH); Serge Mariller, Cheseaux-sur-Lausanne (CH)

(73) Assignee: TESA SA, Renens (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,006

(22) Filed: Nov. 14, 2017

(65) Prior Publication Data

US 2018/0328707 A1   Nov. 15, 2018

Related U.S. Application Data

(63) Continuation of application No. 15/591,049, filed on May 9, 2017, now Pat. No. 9,835,433.

(51) Int. Cl.
*G01B 5/012* (2006.01)
*G01B 7/012* (2006.01)
*G01B 11/03* (2006.01)
*G01B 11/00* (2006.01)

(52) U.S. Cl.
CPC .............. *G01B 5/012* (2013.01); *G01B 7/012* (2013.01); *G01B 11/007* (2013.01)

(58) Field of Classification Search
CPC ................................. G01B 5/012; G01B 7/012
USPC .................................................... 33/561, 558
See application file for complete search history.

(56) References Cited

U.S. PATENT DOCUMENTS

| | | | |
|---|---|---|---|
| 4,270,275 A | 6/1981 | McMurtry | |
| 4,882,848 A | 11/1989 | Breyer et al. | |
| 4,916,339 A | 4/1990 | Lloyd | |
| 5,018,280 A | 5/1991 | Enderle et al. | |
| 5,103,572 A | 4/1992 | Ricklefs | |
| 5,425,180 A | 6/1995 | Breyer | |
| 5,435,072 A | 7/1995 | Lloyd et al. | |
| 6,412,329 B1 * | 7/2002 | Nai ........................ | G05B 19/19 702/95 |
| 6,487,785 B1 | 12/2002 | Ritz | |

(Continued)

FOREIGN PATENT DOCUMENTS

| | | |
|---|---|---|
| DE | 3713415 A1 | 11/1988 |
| EP | 0415579 A1 | 3/1991 |

(Continued)

OTHER PUBLICATIONS

U.S. Appl. No. 15/591,049, filed May 9, 2017.

*Primary Examiner* — Christopher W Fulton
(74) *Attorney, Agent, or Firm* — Maschoff Brennan

(57) ABSTRACT

A touch probe for a coordinate measuring machine with a processor which is programmed to generate a trigger signal signalling a contact between a stylus of the probe and a workpiece, whenever one of a plurality displacement signals exceeds a corresponding threshold. In addition, or in alternative, a delayed trigger is generated based on a processing a plurality of samples of displacement signals that are stored in a buffer. The processor is programmed to minimize anisotropy of the probe response. Furthermore, the thresholds can be modified during operations based on commands received from the CMM controller.

20 Claims, 4 Drawing Sheets

(56) References Cited

U.S. PATENT DOCUMENTS

| | | |
|---|---|---|
| 6,643,944 B2 | 11/2003 | Yoda et al. |
| 6,760,977 B2 | 7/2004 | Jordil et al. |
| 6,941,671 B2 | 9/2005 | Fuge |
| 7,124,514 B2 | 10/2006 | McMurtry et al. |
| 7,347,000 B2 | 3/2008 | Jordil et al. |
| 7,676,945 B2 | 3/2010 | Prestidge et al. |
| 8,140,287 B2 | 3/2012 | Prestidge et al. |
| 9,057,598 B2 | 6/2015 | Vullioud et al. |
| 9,157,722 B2 | 10/2015 | Wooldridge et al. |
| 9,250,055 B2 | 2/2016 | Briegel et al. |
| 9,618,312 B2 | 4/2017 | Shimaoka et al. |
| 9,835,433 B1 * | 12/2017 | Antreasyan ............ G01B 7/012 |
| 2004/0040373 A1 | 3/2004 | Saito |
| 2005/0278969 A1 | 12/2005 | Jordil et al. |
| 2013/0212891 A1 | 8/2013 | Mariller et al. |

FOREIGN PATENT DOCUMENTS

| | | |
|---|---|---|
| EP | 0764827 A2 | 3/1997 |
| EP | 1610087 A1 | 12/2005 |
| EP | 2629048 A2 | 8/2013 |
| WO | 89/07745 A1 | 8/1989 |

* cited by examiner

TOUCH TRIGGER PROBE

This application is a continuation of U.S. patent application Ser. No. 15/591,049, filed on May 9, 2017 now U.S. Pat. No. 9,835,433, which is incorporated herein by reference in its entirety.

FIELD OF THE INVENTION

The present invention concerns, in embodiments, a touch probe for measuring coordinate of points on workpieces, to be used in combination with a coordinate measuring machine (CMM), or another precise coordinate positioning system.

DESCRIPTION OF RELATED ART

Touch probes are well known in the field of dimensional metrology. In a typical case, a contact probe is releasably mounted on the mobile platform of a coordinate machine, and the machine is programmed to bring the touch probe in contact, by a feeler provided for this task, with the workpiece. The feeler typically consists of a precise ruby sphere at the tip of an elongated stylus and, when it touches the workpiece, the probe triggers an electric signal indicating that a contact has occurred. This signal is transmitted to a control unit that records the instantaneous position of the mobile platform and calculates the coordinates of the contact point on the workpiece.

Scanning probes are used for acquiring a plurality of coordinate points along a path on a surface, on which the probe slides without losing contact. These are mounted on the coordinate measure machine similarly to the trigger ones but generate, in lieu of a digital trigger, a deflection signal that is a measure of the deflection of the feeler from its rest position. The probes can record the deflection in one, two, or three coordinates.

In a known form of trigger probes, for example as in EP0764827, U.S. Pat. Nos. 4,270,275 or 6,760,977, the stylus is fastened onto a support with three radial pins arranged symmetrically, each resting on two spheres integrally united with the probe's body. This arrangement constitutes an isostatic connection with six independent contact points; the relative position of the stylus in relation to the probe's body is thus accurately defined. The trigger signal is generated when one of the pins lifts off the two spheres on which it normally rests, thus interrupting the electric contact between the two spheres.

These probes of simple construction combine reliability and accuracy but suffer from several limitations. In particular, the sensitivity of the probe to an external force is not constant but varies according to its direction, exhibiting three lobes in the transverse plane corresponding to the directions of the three pins, and a different sensitivity to axial movement than to transverse ones. This variation of the sensitivity is detrimental to the repeatability of the touch triggering and thus to the quality of the measurement. Altering the arrangement of the pins, as described for example in EP1610087 or DE3713415, can reduce this anisotropy, without eliminating it completely, however.

European patent application EP0360853 teaches a sensor in which the electric circuit is replaced by strain gauges that are directly sensitive to the force applied. U.S. Pat. No. 8,140,287 describes a manner of correcting the anisotropy in the response of probes of this construction by a suitable correction matrix.

In other embodiments, for example, the probes described in documents U.S. Pat. No. 5,435,072 and EP0415579, the contact between the stylus and the part to be measured is detected by a vibration sensor or by an optical sensor.

EP2629048 proposes a different kind of touch probe, utilisable both as a trigger and as a scanning probe, in which the contact and the deflection are deduced by changes in the distribution of light projected by a point source on an image sensor. U.S. Pat. No. 9,157,722 describes a touch probe whose trigger threshold is modified in response to the output of an embedded accelerometer.

U.S. Pat. Nos. 7,124,514 and 9,618,312 disclose touch probes with multiple detectors. These devices are scanning probes and do not generate a trigger signal.

BRIEF SUMMARY OF THE INVENTION

The present invention proposes a touch probe that is free from the above shortcomings and exhibits low or no anisotropy, thanks to the features of the independent claim, namely a touch probe for dimensional measurements of coordinates of points on the surface of an object, comprising: a fixed member with a connection element for mounting the fixed member on a positioning platform of a coordinate-measuring machine; a stylus holder, elastically connected to the fixed member and comprising a reference element; a stylus on the stylus holder; one or more sensors, arranged to generate a displacement signal or several displacement signals in response to a motion of the reference element relative to the fixed member caused by a contact between the stylus and the object; a digital processor receiving the displacement signal or the displacement signals generated by the one or more sensors, the processor being programmed to generate a plurality of directional displacement signals representing the motion of the stylus holder in different directions, and to generate a plurality of trigger signals when an amplitude of any one of said directional displacement signals exceeds a corresponding threshold.

The dependent claims deal with possible implementation variants.

Additional Aspect

Another, possibly independent, variant concerns a touch probe for dimensional measurements of coordinates of points on the surface of an object with a microcontroller arranged to generate a delayed trigger signal, retarded by a predetermined amount by the instant of contact between a feeler and a workpiece. More specifically, this probe may comprise: a fixed member with a connection element for mounting the fixed member on a positioning platform of a coordinate-measuring machine; a stylus holder, elastically connected to the fixed member and comprising a reference element; a stylus on the stylus holder; one or more sensors, arranged to generate a displacement signal or several displacement signals in response to a motion of the reference element relative to the fixed member caused by a contact between the stylus and the object; a digital processor receiving the displacement signal or the displacement signals generated by the one or more sensors, the processor being programmed to generate a trigger signal signalling a contact between the stylus and the object, based upon a plurality of samples of the displacement signal or the displacement signals taken at a plurality of instants in time.

The touch probe could in this case comprise a memory or a buffer to store the plurality of samples. The displacement signal or the displacement signals that the processor is programmed to use may represent the relative motion of the reference element in one, two, or more independent axes.

The plurality of samples may be fed to a a low-pass linear or non-linear filter, for instance a running average, median filter, IIR/FIR filter, Savitzky-Golay, adaptive filter, in particular with a cut-off frequency higher than 50 Hz, preferably higher than 100 Hz. The processor may base its decision on whether or not to generate a trigger on a computed norm, for example an Euclidean norm of the displacement of the probe tip, of the probe holder, or of a displacement vector. The trigger may be generated only when a predetermined number of samples, or consecutive samples, exceeds a threshold, or when two consecutive samples of the displacement signal or of the displacement signals or of the measurement signals exceed a first threshold level, respectively a second threshold level.

The processor may be arranged to generate a delayed trigger signal that is retarded from the contact between the stylus and the object by a delay interval, the variable delay interval comprising a constant term and a slope-dependent term that is computed in the processor based on the time derivatives of the displacement signal, or of the displacement signals, or of the measurement signals.

The generation of the delayed trigger may include the summation of a signal with an inverted and delayed copy of itself, and the comparison of the resulting sum with a predetermined threshold, which can be zero, to generate a delayed trigger signal.

The touch probe may be programmed to determine an inhibit condition based on the samples of the displacement signal or the displacement signals taken at a plurality of instants in time, and to veto the generation of triggers while the inhibit condition is true, and could include a data interface adapted for uploading the samples of the displacement signal or the displacement signals taken at a plurality of instants in time to a host system, which could include the digital processor, remotely. The buffer of samples could also be uploaded to the host system at each trigger.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
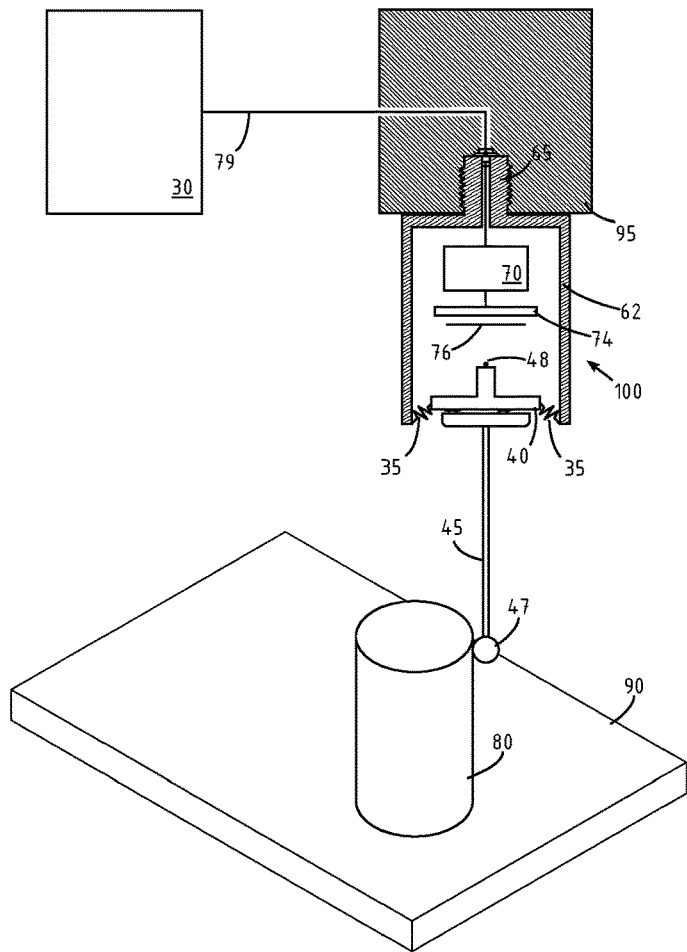
FIG. 1 shows schematically the structure of a touch probe according to the invention.

FIG. 1 illustrates schematically the structure of a touch probe according to an aspect of the invention. The probe 100 comprises a feeler that is composed, in this example, of an elongated stylus 45 with a calibrated sphere 47 at its tip. Other forms of feelers could be used in the frame of the invention, for example the sphere 47 could be replaced by a disc, and the stylus 45 needs not be straight, and could have multiple crossed arms.

The stylus is attached to a stylus holder 40. Preferably, but not necessarily, the connection between stylus and holder is such that the stylus can easily be detached and replaced with another, according to the needs. In a preferable embodiment, the stylus is attached magnetically to the holder 40.

The housing 62 of the probe 100 is fixed on a positioning platform 95, which may be the quill of a coordinate machine that is capable of moving in space, under the instructions of a CMM controller 30. The connection between the probe 100 and the positioning platform 95 may take various forms, the threaded rod represented in FIG. 1 being its most usual realization.

The stylus holder 40 is connected to the fixed member 62 by resilient members 35 such that, when the feeler touches the workpiece 80, the holder 40 will be moved from its rest position, relative to the fixed member 62. The motion of the probe holder will be determined by the amplitude and direction of the displacement of the touch 47. In a lateral contact, the holder will rotate and, in an axial contact, the holder will rise axially.

The probe detects tiny movements of the tip optically: when the stylus touches and is pushed against the workpiece, the resilient element 35 flexes and the holder 40 moves from its nominal rest position, in three dimensions. The holder 40 carries, opposite to the stylus 45 and inside the probe, an optical reference element 48, whose position is observed by an imaging device 73. In a particular embodiment, the resilient elements 35 are relatively stiff, and their deformation is limited by design to a few μm. A safety mechanism, including a magnetic contact and a safety spring, allows further tilt of the stylus without straining the probe. Should the tilt be increased beyond safe limits, the stylus falls from the probe body.

The sensor comprises an optical reference element 48 and an imaging device 73. However, different types of sensors can also be used. For example magnetic, Hall effect, capacitive or inductive sensors can be used to measure the 3D displacements of the stylus tip. Alternatively, several linear encoders (optical, inductive, capacitive or magnetic) or strain gauges can be used to measure the displacements along different directions.

Preferably, the reference element is a light-emitting diode (LED) 48. Each movement of the stylus tip 47 generates a corresponding movement of the LED 48. The LED illuminates an optical sensor circuit 73 above it through an optical mask 76.

The LED 48 follows the movements of the stylus relative to the probe body, such that any deflection of the stylus induces of necessity a displacement of the LED from its nominal position. The displacement along the axis of the probe (that we will denote conventionally by z) has different kinematics than the transverse ones, along coordinates x and y. The resilient elements 35 acts like a fulcrum for transverse movements (x, y), but transmits the axial movements (z) unchanged. Accordingly, the axial movements of the LED and that of the tip of the probe are essentially the same, while the transverse ones will be scaled in reason of the ratio between the length of the stylus and the distance between the LED and the rotation centre.

Another effect that introduces an anisotropy is the bending of the stylus. An elongated stylus is in fact rather flexible when pushed laterally and much less so when the contact force is axial. The consequence is that, when the tip is deflected in the transverse plane (x,y), the corresponding deflection of the LED 48 is less than what the simple geometric reasoning above would predict. This effect can often be neglected, but may be quite appreciable if the stylus 45 is particularly long or flexible.

The touch probe has a control unit 70, programmed to determine and measure the movements of the reference element 48 relative to its normal rest position from the image, decide from these whether the sphere 47 has touched the workpiece 80, and in this case generate a trigger signal 79 for the CMM controller 30. This arrangement is described in more detail by patent application EP2629048, in the name of the applicant.

Figure 2:
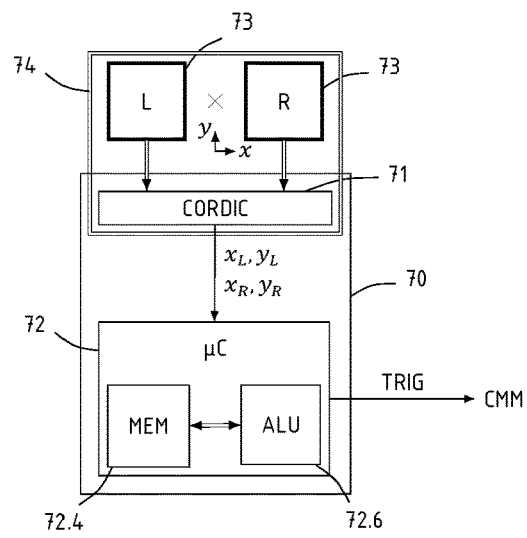
FIG. 2 illustrates in a block schematic diagram the imaging unit and the processor of the inventive probe.

FIG. 2 illustrates schematically the imaging device 73 and the processor 70. In a specific embodiment, the image processing is carried out in two separate integrated circuits. The first one is an ASIC 74 that includes a preprogrammed digital processor 71, comprising a correlation unit and a CORDIC arithmetic and trigonometric unit and, on the same silicon die, the image sensor 73. A programmable microcontroller 72 completes the image-processing system. Other arrangements would be possible, however.

The ASIC 74 is in a transverse plane, which is orthogonal to the longitudinal axis z of the probe that comprises the x and y directions. The point directly above the LED 48 is marked with a cross. It measures tiny movements of the LED by observing an illumination pattern, projected by the LED through the periodic micro-lens array 76, on two arrays of photodiodes, denoted as L and R.

The left and right arrays are aligned in y and read the same y-value. The x position on either array, on the other hand, is parallax-shifted by the x separation between the arrays. This is used to extract the third coordinate z.

More in detail, the pre-processor 71 in the ASIC 74 computes the position of the illumination pattern in x and y for each array. It generates digital values that represent the position of the pattern relative to a rest position, in both coordinates, which are denoted $(x_L, y_L)$, respectively $(x_R, y_R)$. These values are calculated continuously by the pre-processor 71 in real-time, at a predetermined rate, for example every 25 µs.

The microcontroller 72 reads the values $(x_L, y_L)$, $(x_R, y_R)$ and generates a trigger signal informing the CMM that the stylus has touched the workpiece. To this end, the microcontroller computes internally the 3D coordinates x,y,z:
x is obtained by summing the left and right values;
y is taken equal to $y_L$, ($y_R$, or an average, would serve as well);
z is given by the difference between $x_L$, and $x_R$.

Preferably, the pre-processor 71 and the microcontroller are arranged such that the values of x,y,z are directly provided in a common suitable unit, for example in nanometers. Should this not be the case, however, the microcontroller 72 could be programmed to introduce the necessary transformations.

The computation of x,y,z may be repeated each time new values are available, that is at the rate defined by the pre-processor 71, or at a different rate. Importantly, the microcontroller includes a memory area 72.4 that is used for storing a plurality of samples of x,y,z signals. This memory area, which could be arranged as a circular buffer, stores the position of the LED 48 in a stated time interval. For example, the memory area has a depth of 128 samples in x, y, and z, storing approximately 3 ms duration of data. This memory area is used to filter the signal, or to time-shift the trigger instant, as it will be described later on, but could also be transferred to the CMM controller 30 after each touch, thereby allowing an off-line correction of the coordinates of the contact point, based on the deviation profiles in x, y, z.

In an alternative embodiment, the microcontroller embedded in the probe could deal simply with the storing of the displacement data in a suitable buffer, which is transferred to the CMM controller 30, acting as host system, and the computation of the trigger is carried out in the host system.

Figure 3:
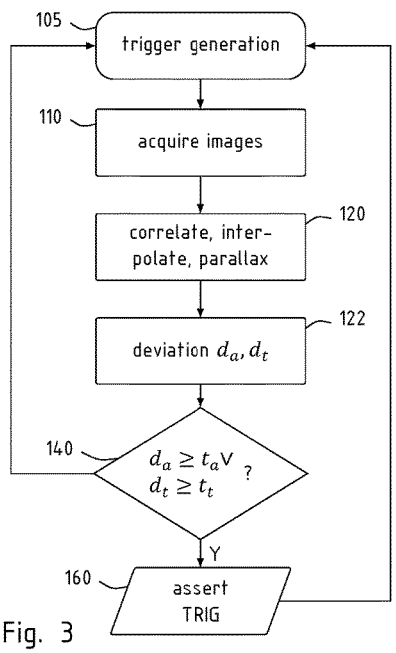
FIG. 3 illustrates a trigger generation method.
Figure 5:
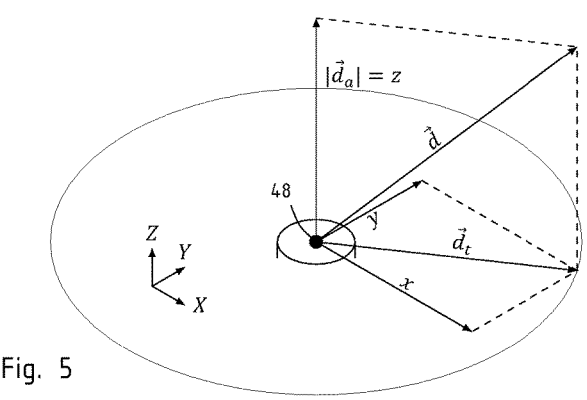
FIG. 5 illustrates schematically the displacement of a component of the probe of the invention.

A trigger that is approximately independent from the direction of approach is obtained, as shown in FIG. 3, by creating directional trigger signals. FIG. 5 illustrates the geometry of the displacements. The contact moves the LED 48 along a displacement vector d whose components x, y, z are known to the microcontroller at all moments. The processor computes the axial and transverse components of the deviation: $d_a = |z|$ and $d_t = \sqrt{x^2 + y^2}$ that is the Euclidean norm of the 2-dimensional vector (x, y). Each of these is compared to a separate threshold: $t_a$ for the axial deviation, and $t_t$ for the transverse one. A trigger signal is sent to the CMM when either $d_a \geq t_a$ or $d_t \geq t_t$. It is possible to reduce the variations of pretravel by choosing suitable threshold values. With long styli, $t_a$ will be chosen progressively larger than $t_t$. Preferably, the CMM controller 30 communicates to the probe micro-controller 72 the length of the stylus. With this method, the pretravel can be made equal for lateral and axial contacts; however, for oblique angles the pretravel will be bigger.

Figure 4:
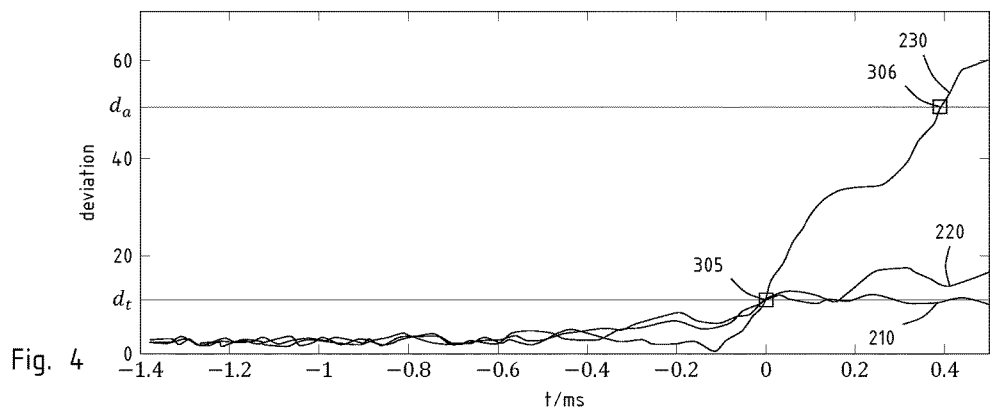
FIG. 4 plots the deflection of the probe measured in three different contacts, with different directions of approach.

FIG. 4 plots the deviation d as a function of time in three distinct touches between the feeler 47 and a spherical reference body. Curve 230 corresponds to an axial contact, in which the probe moves downwards in the 'z' direction and the LED 48 and the stylus tip 47 move by the same amount. Curve 210 is the displacement during a lateral contact: the feeler 47 moves in the horizontal plane that contains the centre of the reference sphere, the deviation profile is much shallower, due to the lever arm between the stylus tip and the LED mentioned above. Curve 220 stands for an intermediate oblique approach. The transverse trigger is generated at point 305, when the profiles cross the horizontal threshold line $d = t_t$ while the axial trigger is generated at a later instant, 306, when the deviation crosses the line $d = t_a$.

A portion of the transverse component of pretravel is due to the bending of the stylus which is not measured by the optical sensor. For long styli, the pretravel due to bending can dominate over the pretravel for a rigid stylus, dependent on the material and geometry of the latter. To compensate for the bending, the threshold for the axial trigger $t_a$ can be increased proportionately to equalize the pretravel with the transverse one.

Figure 6:
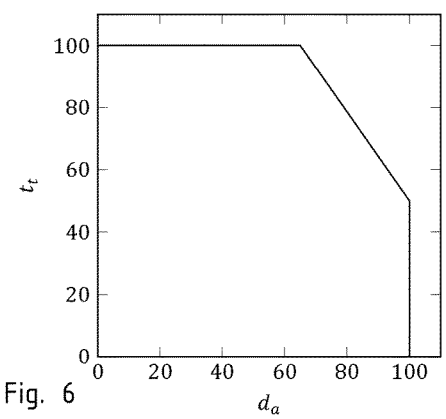
FIG. 6 is a plot of an adaptive trigger threshold.

In a preferred variant, to make the pretravel more uniform, the value of at least one of the thresholds is not constant, but is computed by the processor based on the values of the directional displacements, for example, the value of $t_t$ could be chosen according to the value of $d_a$, becoming progressively smaller when $d_a$ approaches $t_a$, as illustrated in FIG. 6. In addition, in such a variant the probe micro-controller 72 can calculate the angle of approach θ (azimuth) from arctan $\theta = d_t / d_a$, and reduce the threshold $t_t$ dependent on θ.

As it can be seen in FIG. 4, the displacement signals are not smooth and are subject to noise. Besides the noise of the sensor system, the vibrations of the CMM and effects such as "contact bounce" introduce fluctuations in the displacement signals which in turn can cause false triggers. In order to keep the trigger threshold as low as possible, for accurate contact detection, the false triggers must be eliminated by other means. A running average or an exponential smoothing of the displacements (separately in axial and transverse directions) can be used, for example, to measure the noise level and veto the trigger if it is above a preset threshold. False triggers due to spikes can be eliminated by requiring two or more consecutive displacement measurements to be above the threshold.

The probe microcontroller 70 can apply more sophisticated filters using the sequential measurements stored in the memory, such as an IIR or FIR or median filter. Furthermore, distinct filter parameters, such as coefficients or cut-off frequencies, can be applied to each of the measuring directions to take into account the different vibrational modes in the axial and transverse directions. Typically, the frequencies for axial vibrations are higher than the transverse ones.

Preferably, the trigger signal is generated by the microcontroller 70 that is embedded in the touch probe, and is transmitted to the CMM controller 30 through the connector 65 (FIG. 1). The connector 65 also provides the electrical power to the probe. The probe of the invention can then be used as a direct replacement of a conventional electromechanical trigger probe, with little or no changes in the CMM. The microcontroller can be arranged to signal the trigger by a drop of the current flowing along the wire 79, for a preset duration, simulating the opening of an electromechanical switch. In another variant, the displacement signals of the probe holder are stored in a buffer in the probe and uploaded to the host CMM after each trigger, to be processed.

The connector 65 also transmits digital data from the CMM controller 30 to the probe, directly or through a probe interface (not shown). In the case, the touch probe includes a suitable communication interface capable of receiving and transmitting instructions and data from and to the CMM controller. A simple protocol, such as 1-wire, can be used to transmit trigger parameters such as thresholds and filter parameters to the probe microcontroller. The parameters are predetermined for each type of stylus that is used and take into account the length, the stiffness and the geometry (e.g. straight or "star" shaped) of the stylus. The trigger parameters, in particular the thresholds, can be modified during the operation of the CMM as well. For example, during the fast movement of the CMM from one measurement point to the next, the CMM issues a signal (generally referred to as "Damp" or "damping") which can be communicated to the probe microcontroller which in turn increases the threshold to avoid false triggers. The start and end of the Damp period can be signalled to the microcontroller by a drop in current, in the connector 65, of different durations. Optionally, the CMM controller can also signal to the probe microcontroller to lower the thresholds in order to increase the accuracy for measurements at low approach speed.

When the probe analyses the displacement of the stylus in different directions, for example axially and transversally, the cut-off frequencies and the parameters of the filters applied to each direction, are preferably independently settable.

An alternative trigger generation may be based on the absolute displacement of the LED from its rest position, computed by the Euclidean norm, $d_e = |\vec{x}| = \sqrt{x^2+y^2+z^2}$, which is computed in real-time in the microprocessor.

The deviation signals calculated in this way, including the transverse displacement, $d_t$, the axial displacement $d_a$, and the Euclidean norm displacement $d_e$, and any other signal that captures microscopic movements of the holder from its rest position, are unavoidably affected by electronic and vibration noise, which can be mitigated by considering a plurality of samples taken at different times, for example by a digital filter. A simple filter that has given good results consists in a running average of 4 consecutive samples, with equal coefficients, but other filters, preferably with a cut-off frequency between 50 Hz and 100 Hz are possible and applicable.

The sequential data in the memory 72.4 can also be used to perform quality checks on the probe operation. For example, the degree of dispersion of the measurements around a filtered mean value can be indicative of a noisy environment or unreliable probe operation. The probe microcontroller 70 can transmit a signal to the CMM controller flagging data of poorer quality.

A first-level (prompt) trigger signal is obtained by comparing a deviation signal d, possibly filtered, with a predetermined threshold $d_0$. The measure of the CMM will be the more precise the shorter the distance, or pretravel that the machine is allowed to move between the moment of contact and the instant when the trigger is generated. For this reason, the threshold $d_0$ is chosen as low as practicable, but not so low as to induce an excessive number of false triggers on noise.

Figure 7:
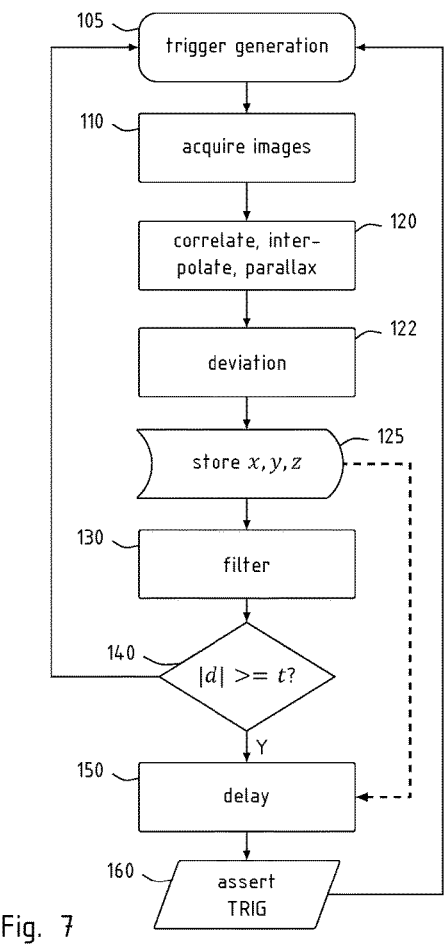
FIG. 7 illustrates a further method of trigger generation.

Preferably, the probe of the invention is arranged to correct the trigger instant by a variable delay that is computed for each trigger based on the stored deviation values, in order to reduce the dispersion between the instant of contact and the instant of trigger. FIG. 7 illustrates this process in a flowchart, and a possible method of computing the compensating delay will be now described referring to FIG. 8.

Figure 8:
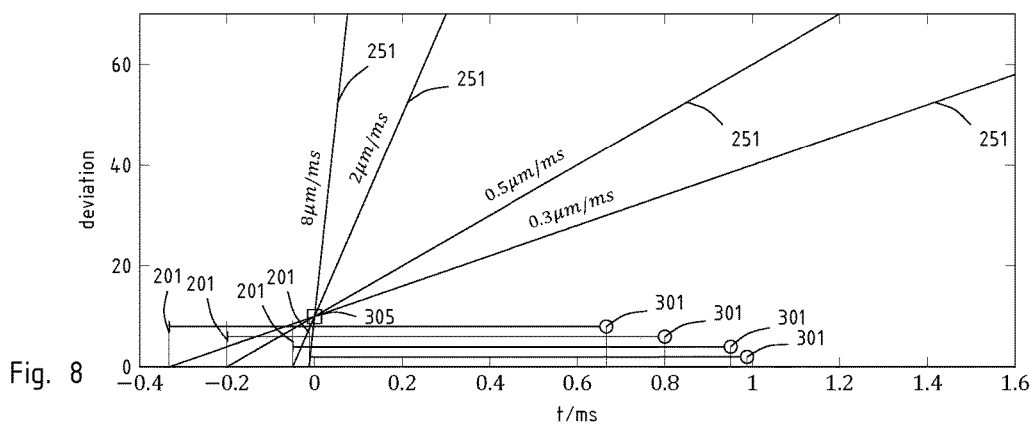
FIG. 8 illustrates the generation of a compensation delay.

FIG. 8 is an idealized representation of the real contacts plotted in FIG. 4. Four deviation profiles 251 are represented, each having a different slope, due to the contact geometry and the approach speed. In each case, the deviation exceeds a first-level trigger threshold at the same instant 305 but the actual contact has already taken place at instants 201 that are variously advanced with respect to the trigger time. The probe is programmed to determine the slope of the deviation from the stored samples and compute a variable delay, dependent from the slope, such that the final triggers are asserted at points 301, which are retarded by a fixed amount after the contact points 201. The delays can be determined in various ways, compatible with the computing resources of the microcontroller 72, for example by estimating the contact time 201 by a linear extrapolation of the deviation profile, and adding a determined fixed delay.

The advantage of this method is that the delay between the first contact and the final trigger is a constant, independent from the stylus length, the direction and the speed of approach. Consequently, for a given approach speed, the pretravel is constant, independent from the stylus length and the direction of approach, to the extent that bending of the stylus can be neglected.

Alternatively, the speed of approach can be communicated by the CMM controller 30 to the probe micro-controller 72, which adjusts the delay accordingly. Thereby the delay is shortened for higher speeds to avoid excessive pretravel. In another alternative the CMM controller 30 can communicate to the probe micro-controller both the speed of approach and the stylus length. Using these two parameters, the micro-controller 72 can extract from the deviation slope the angle of approach (azimuth). The computed delay can then be adjusted as a function of azimuth to account for the pretravel due to the bending of the stylus.

In another variant of the invention, a variable delay between the contact instant 201 and the final trigger 301 is created not by a time shift, but by a shaping operation on the signal, as it will be explained with reference to FIGS. 6 and 7.

Figure 9:
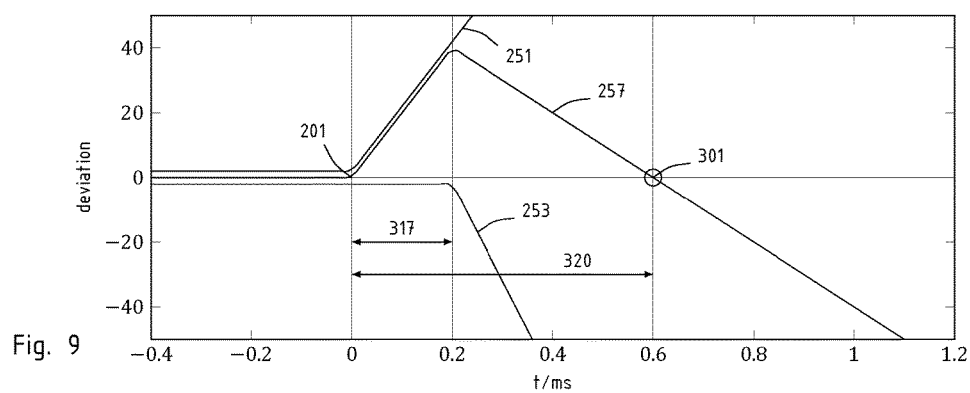
FIG. 9 plots a simulation of signal processing and trigger generation.

FIG. 9 shows a shaping operation consisting in creating a delayed and inverted replica 253 of the initial deviation profile 251, then summing it with the initial profile 251 to obtain a summed waveform 257. The summed waveform 257 is compared with a predetermined trigger level, which may be zero. In this case, since the deviation is expected to rise linearly until the CMM stops, the inverted signal 253 is multiplied by a fixed gain factor, to allow the summed waveform 257 to return quickly to zero. This scaling may be omitted if the deviation profiles have another shape due to the prior filtering step, however.

If the deviation d(t) is approximated by a linear ramp, and the delayed profile 253 is retarded by a time δ 317 and multiplied by a factor −a, then the summed profile 257 returns to zero at time 301 given by a/(1−a)·δ, independent from the slope of the original signal 251. This manner of generating a delayed trigger immune to slope variations is not limited to linear ramps, but holds for a large class of signal shapes.

Computationally, this operation is not particularly burdensome and could be implemented as a second-order FIR filter. In this variant, the pretravel is again independent of the direction of approach and the stylus length for any approach speed, to the extent that the bending of the stylus can be neglected.

REFERENCE NUMBERS USED IN THE DRAWINGS 30 host system (CMM controller)
35 suspension
40 stylus holder
45 stylus
47 touch
48 reference element, LED
62 fixed support
65 connector (M8 thread)
70 digital processor
71 CORDIC
72 microcontroller
72.4 memory
72.6 arithmetic-logic unit
73 imaging device
74 ASIC
76 mask
79 trigger signal line
80 workpiece
90 table
95 positioning platform
100 touch probe
105 trigger generation routine
110 image acquisition step
120 correlation, interpolation, and parallax steps
122 deviation calculation
125 data storage
130 filtering step
135 shaping step
140 comparison with threshold
150 insertion of variable delay
160 generation of a trigger signal
201 instant of contact
210 deviation, lateral (0°) contact
220 deviation, oblique contact
230 deviation, axial (90°) contact
251 deviation profiles
254 delay intervals
301 trigger
305 trigger on the transverse deviation profile
306 trigger on the axial deviation profile
317 delay of the inverted signal
320 total trigger delay

The invention claimed is:

1. A touch probe for dimensional measurements of coordinates of points on a surface of an object, comprising:
a fixed member with a connection element for mounting the fixed member on a positioning platform of a coordinate-measuring machine;
a stylus holder, elastically connected to the fixed member and comprising a reference element;
a stylus on the stylus holder;
one or more sensors, arranged to generate a plurality of displacement signals in response to a motion of the reference element relative to the fixed member caused by a contact between the stylus and the object;
a digital processor receiving the displacement signals generated by the one or more sensors, the processor being programmed to generate an intentionally delayed trigger signal that is delayed from the contact between the stylus and the object by a predetermined delay interval.

2. The touch probe of claim 1, comprising a memory or buffer arranged to store a plurality of samples of the displacement signals taken at a plurality of instants in time, the processor being programmed to generate a trigger signal based on the plurality of samples.

3. The touch probe of claim 2, wherein the processor is programmed to generate a trigger signal when a predetermined number of consecutive samples exceed a threshold level.

4. The touch probe of claim 2, wherein the digital processor is programmed to determine an inhibit condition based on the samples of the displacement signals, and to veto the generation of triggers when the inhibit condition is true.

5. The touch probe of claim 2, comprising a data interface adapted for uploading the samples of the displacement signal or the displacement signals taken at a plurality of instants in time to a host system.

6. The touch probe of claim 5, wherein the digital processor is located in the host system.

7. The touch probe of claim 1, wherein the processor is programmed to generate a plurality of directional displacement signals representing the motion of the stylus holder in a plurality of different directions in space.

8. The touch probe of claim 1, comprising a low-pass filter arranged to process the plurality of displacement signals.

9. The touch probe of claim 8, wherein the low-pass filter includes a cut-off frequency of 100 Hz.

10. The touch probe of claim 8, the processor being programmed to generate a plurality of directional displacement signals representing the motion of the stylus holder in different directions in space, wherein independent low-pass filters with different cut-off frequencies are applied to each of the directional displacement signal's directions separately.

11. The touch probe of claim 1, wherein the processor is arranged to compute the delay interval as sum of a constant term and a slope-dependent term, the slope-dependent term being computed in the processor based on a time derivative.

12. The touch probe of claim 1, wherein the generation of the delayed trigger in the processor includes summation of a signal with an inverted and delayed copy of itself and comparison of the resulting sum with a predetermined threshold.

13. The touch probe of claim 12, wherein the predetermined threshold includes zero.

14. The touch probe of claim 1, wherein the generating of the intentionally delayed trigger signal includes use of a norm of the displacement signals.

15. The touch probe of claim 14, wherein the norm includes a Euclidean norm.

16. The touch probe of claim 1, wherein the reference element is a light emitting source, illuminating an optical sensor through an optical mask.

17. The touch probe of claim 1, further comprising a communication interface capable of receiving instructions from a coordinate-measuring machine (CMM) controller.

18. The touch probe of claim 17, wherein a plurality of samples are stored in memory and are analysed by the processor to derive a signal quality parameter which is transmitted to the CMM controller.

19. A touch probe for dimensional measurements of coordinates of points on a surface of an object, comprising:
a fixed member with a connection element for mounting the fixed member on a positioning platform of a coordinate-measuring machine;
a stylus holder, elastically connected to the fixed member and comprising a reference element;
a stylus on the stylus holder, physical properties of the stylus being different in an axial direction compared to a lateral direction;
a sensor arranged to generate a plurality of directional displacement signals in response to a motion of the reference element relative to the fixed member caused by a contact between the stylus and the object, the directional displacement signals representing the motion of the stylus holder in different directions;
a digital processor receiving the displacement signals generated by the one or more sensors, the processor being programmed to generate an intentionally delayed trigger signal that is delayed from the contact between the stylus and the object by a predetermined delay interval.

20. The touch probe of claim 19, wherein the processor further programmed to:
generate an axial displacement signal representing the motion of the stylus holder along a general longitudinal axis of the probe, and a lateral displacement signal representing the motion of the stylus holder in a direction orthogonal to the general longitudinal axis;
wherein the contact between the stylus and the object are based on an amplitude of either the axial displacement signal exceeding an axial threshold or the lateral displacement signal exceeding a lateral threshold that is different from the axial threshold.

* * * * *